US006059509A

United States Patent [19]
Ostwald

[11] Patent Number: 6,059,509
[45] Date of Patent: May 9, 2000

[54] LIBRARY STORAGE MODULE WITH CARTRIDGE PASS-THROUGH SYSTEM

[75] Inventor: Timothy C. Ostwald, Louisville, Colo.

[73] Assignee: Storage Technology Corporation, Louisville, Colo.

[21] Appl. No.: 09/108,564

[22] Filed: Jul. 1, 1998

[51] Int. Cl.[7] ........................... G11B 15/68; G11B 17/22; B65G 1/06
[52] U.S. Cl. ........................... 414/277; 414/280; 414/807
[58] Field of Search ................................... 414/277, 280, 414/807

[56] References Cited

U.S. PATENT DOCUMENTS

| | | | |
|---|---|---|---|
| 3,715,040 | 2/1973 | Polus et al. ........................... | 414/277 X |
| 4,864,438 | 9/1989 | Munro ....................................... | 369/32 |
| 4,932,826 | 6/1990 | Moy et al. . | |
| 4,937,690 | 6/1990 | Yamashita et al. ........................ | 360/92 |
| 5,277,534 | 1/1994 | Anderson et al. ................... | 414/277 X |
| 5,336,030 | 8/1994 | Ostwald et al. .......................... | 414/277 |
| 5,429,470 | 7/1995 | Nicol et al. . | |
| 5,460,476 | 10/1995 | Gazza . | |
| 5,479,581 | 12/1995 | Kleinschnitz . | |
| 5,570,337 | 10/1996 | Dang . | |
| 5,700,125 | 12/1997 | Falace et al. . | |
| 5,703,843 | 12/1997 | Katsuyama et al. ................. | 414/280 X |

OTHER PUBLICATIONS

ATL Products Inc.'s ACL5480/5490 Automated Tape Library, 1995 Dataquest Incorporated, May 1, 1995, pp. 16–17.

Overland Data, Inc. 1998, DLT Library Express, pp. 5–12.

*Primary Examiner*—Robert P. Olszewski
*Assistant Examiner*—Gerald J. O'Connor
*Attorney, Agent, or Firm*—Brooks & Kushman P.C.

[57] ABSTRACT

A library storage module is provided with a pass-through system operable to transfer tape cartridges in any direction between the original library storage module and an additional library storage module, wherein each library storage module is provided with a respective pass-through port. A pass-through tray is located in the original library storage module, and is sized to receive at least one cartridge. Preferably, the pass-through tray is provided with an extension bar attached thereto which provides an engagement surface for an actuator, such as a robotic arm, located inside each library storage module. A guide rail is provided along which the pass-through tray moves, the guide rail extending through the respective pass-through ports of the library storage modules. Upon instructions from a processor, one of the robotic arm applies force to the extension bar, thereby moving the pass-through tray and any cartridges contained therein along the guide rail between the adjacent library storage modules. Therefore, the pass-through system is operable to transfer cartridges between adjacent library storage modules without requiring a change of the orientation of the cartridges, and without requiring the use of additional motors and sensors.

22 Claims, 3 Drawing Sheets

LIBRARY STORAGE MODULE WITH CARTRIDGE PASS-THROUGH SYSTEM

TECHNICAL FIELD

This invention relates to cartridge libraries, and in particular to a system and method for transferring tape cartridges between adjacent library storage modules.

BACKGROUND ART

A popular device for handling large amounts of information in a data processing system is the automated cartridge library. These systems store and manage large numbers of cartridges containing magnetic tape on which data is recorded. Typically, an automated cartridge library is comprised of arrays of uniquely identified cells, each cell being formed to contain a single tape cartridge. The cell arrays each hold a plurality of tape cartridges, and each tape cartridge has some kind of identifying information, such as a bar code. A robotic arm, having an optical system for selecting the correct cartridge, is operable within the automated cartridge library to locate a particular cell, retrieve a tape cartridge therefrom, transport the tape cartridge to a tape drive, and insert the tape cartridge into the tape drive. The tape drive is then operable to read/write data from/to the magnetic tape of the tape cartridge. In this way, a large number of tape cartridges are automatically accessible to a single tape drive mechanism. The operation of the automated cartridge library is typically controlled by a host computer communicating with a library control unit associated with the library.

In some applications, such a large amount of data must be stored that it is desirable to employ more than one automated cartridge library in order to manage the large number of tape cartridges. Rather than repeating an entire automated cartridge library system including all the necessary control units, the host computer, and the tape drive, it is desirable to link together multiple library storage modules. Each library storage module contains cell arrays and a robotic arm as described above, but does not require an additional host computer or tape drive. Multiple library storage modules are arranged adjacent one another and pass-through systems are provided for transferring tape cartridges from one library storage module to an adjacent library storage module. In this arrangement, the host computer can direct a library storage module to pass a tape cartridge to an adjacent library storage module, where it is picked up by the robotic arm of the adjacent library storage module and transported to, and inserted in, the tape drive of the adjacent library storage module. Such a configuration provides advantages to managers of large amounts of data who are able to simply add additional library storage modules as their need for data storage grows.

As described above, an important component in the utilization of multiple library storage modules is the pass-through system, which removes a tape cartridge from a first library storage module and conveys the cartridge to a second library storage module. In many prior art methods, the pass-through system must change the orientation of the cartridge from that which is suitable for the first library storage module to that which is suitable for the second library storage module. Specifically, the unique identifying information for each tape cartridge, typically a bar code, is affixed to a face of the cartridge which protrudes from a cell when the cartridge is stored therein. Therefore, in the prior art, the pass-through system must remove a tape cartridge from a first library storage module at a first orientation and rotate the tape cartridge to a second orientation for the second and adjacent library storage module.

To achieve the operations described above, many prior art pass-through systems have required the use of motors, power amplifiers, sensors, and electrical cabling. While such prior art pass-through systems have been effective, they have suffered from problems of size, complexity, and cost. First, the use of motors and associated equipment requires the pass-through system to be relatively large. Since space is made for the pass-through system by removing cartridge cells from the cell arrays in each library storage module, the extra space required by the motors and associated equipment causes additional cartridge cells to be eliminated, thereby reducing the overall storage capacity of each library storage module. The motors, amplifiers, and sensors also increase the complexity of the pass-through system, making it more expensive to manufacture initially and more expensive to maintain over the life of the library storage module. An additional cost with regard to prior art pass-through systems is the need for a library management unit to interpret and convey commands between a host computer and the library control unit of each library storage module. A library management unit is necessary because signals must be supplied to the motors and sensors of the pass-through system during operation.

Commonly owned U.S. Pat. No. 5,700,125 issued to Falace et al., discloses a pass-through system wherein motors, amplifiers, and sensors are eliminated, and the force of gravity alone is used to move a tape cartridge from a cell in an originating library storage module, rotate the cartridge, and deliver the cartridge to a cell in a receiving library storage module. In operation, signals cause a robotic arm of the originating library storage module to present a tape cartridge to a designated entry cell in the originating library. The back of the entry cell opens to an entrance chute of a pass-through port, and the cartridge slides into the entrance chute by the force of gravity. A bucket mounted on the entrance chute is positioned to receive the cartridge, and the bucket pivots against the force of a biasing spring to present the cartridge to an exit chute of the pass-through port. The tape cartridge has now been turned so that the identifying label thereof is now facing inward to the receiving library storage unit module. As the bucket pivots, the cartridge slides out of the bucket, down the exit chute, and into an exit cell in the receiving library storage module.

Therefore, the pass-through system of U.S. Pat. No. 5,700,125 decreases the size, complexity, and cost compared with prior art pass-through systems. However, the reliance completely on gravity to provide the pass-through function does have disadvantages. Specifically, in order to provide complete interchangeability between two library storage modules, two pass-through systems are required in horizontally adjacent library storage modules: one pass-through system from the originating library module to the receiving library module, and a second pass-through system from the receiving library module back to the originating library module. Furthermore, the pass-through system is only capable of working in one direction in vertically adjacent libraries, such that cartridges that are passed to a downwardly adjacent library module can never be passed back upward. Lastly, the process by which the tape cartridge is transferred between library storage modules still requires the orientation of the cartridge to be changed in order to ensure proper library operation.

DISCLOSURE OF THE INVENTION

Therefore, it is an object of the present invention to provide a library storage module with a pass-through system which is completely interchangeable, so as to be operable in both directions between adjacent library storage modules.

It is another object of the present invention to provide a library storage module with a pass-through system which is capable of transferring cartridges to an additional library storage module without requiring a change in the orientation of the cartridge.

It is another object of the present invention to provide a library storage module with a pass-through system that operates reliably within an automated cartridge library without the need for additional motors, amplifiers, sensors, and associated electrical equipment.

It is another object of the present invention to provide a pass-through system which is compact so as to minimize the loss of storage capacity in the library storage module.

It is yet another object of the present invention to provide a library storage module with a pass-through system which is relatively inexpensive to produce and maintain.

Accordingly, a library storage module is provided with a pass-through system operable to transfer tape cartridges in any direction between the original library storage module and an additional library storage module, wherein each library storage module is provided with a respective pass-through port. A pass-through tray is located in the original library storage module, and is sized to receive at least one cartridge. Preferably, the pass-through tray is provided with an extension bar attached thereto which provides an engagement surface for an actuator, such as a robotic arm, located inside the library storage module. A guide rail is provided along which the pass-through tray moves, the guide rail extending through the respective pass-through ports of the adjacent library storage modules. Upon instructions from a processor, one of the robotic arms applies force to the extension bar, thereby moving the pass-through tray and any cartridges contained therein along the guide rail between the adjacent library storage modules. Therefore, the pass-through system is operable to transfer cartridges between adjacent library storage modules without requiring a change of the orientation of the cartridges, and without requiring the use of additional motors and sensors.

The above objects and other objects, features, and advantages of the present invention are more readily understood from a review of the attached drawings and the accompanying specification and claims.

BEST MODES FOR CARRYING OUT THE INVENTION

Figure 1:
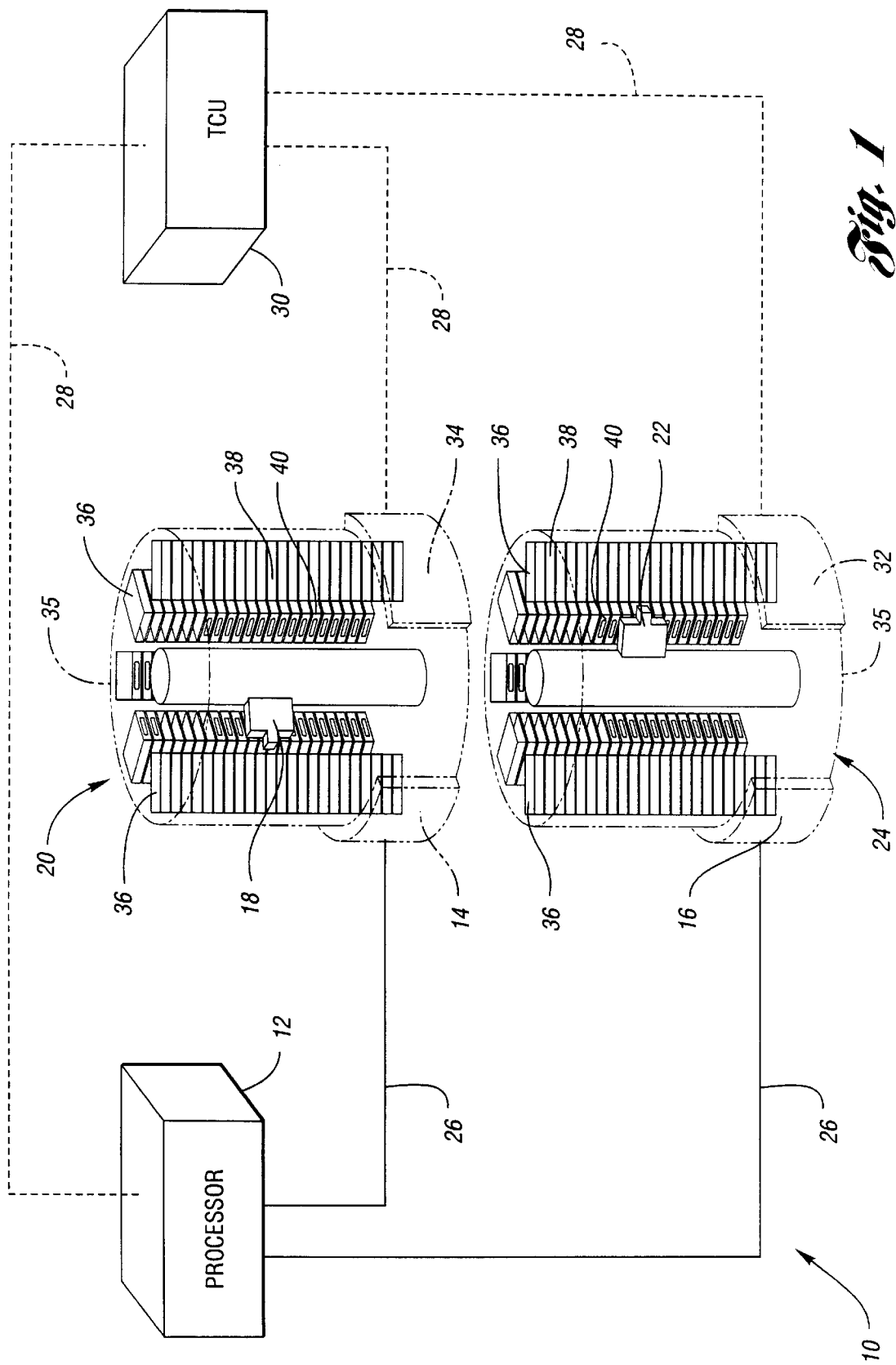
FIG. 1 is a schematic representations of an automated cartridge library in accordance with the present invention.

FIG. 1 shows an automated cartridge library 10 which, for exemplary purposes only, will be described as containing two library storage modules. It is understood, of course, that the following description is equally applicable to automated cartridge library systems containing a multiplicity of adjacent storage modules.

As shown in FIG. 1, the operation of automated cartridge library 10 is directed by a processor 12, such as a host computer. Processor 12 communicates with a first library control unit (LCU) 14 and a second LCU 16. The operation of a robotic arm 18 within a first, original library storage module (LSM) 20 is governed by LCU 14 which interprets signals from processor 12 and provides appropriate signals to robotic arm 18 to control its motion and operation. The operation of a robotic arm 22 within a second, additional LSM 24 is governed by LCU 16 which interprets signals from processor 12 and provides appropriate signals to robotic arm 22 to control its motion and operation. Signals from processor 12 control the handling and storage of tape cartridges within original 20 and additional 24 LSMs, and are conducted over wires 26. Data to be written to a tape cartridge 40 or read from a tape cartridge 40 is communicated over wires 28 through a tape control unit (TCU) 30, thereby separating control signals from data signals. TCU 30 controls the operation of a tape drive 32 associated with additional LSM 24 and an optional tape drive 34 associated with original LSM 20.

Still referring to FIG. 1, LSMs 20 and 24 are each provided with a suitable housing 35 to ensure operator safety and data security. As shown, LSMs 20 and 24 each comprise a plurality of arrays 36, wherein each array 36 consists of a plurality of individual storage cells 38 which are sized to hold tape cartridges 40. It will be understood that even though LSMs of cylindrical configuration are depicted herein, the present invention is equally applicable to LSMs of any geometry.

In general terms, if there is a need to read data from a tape cartridge 40 in additional LSM 24, robotic arm 22, in response to signals from processor 12, retrieves the appropriate tape cartridge 40 from a storage cell 38 located anywhere within additional LSM 24 and inserts cartridge 40 in tape drive 32. Signals from processor 12 through TCU 30 then control the reading/writing of data from/to the cartridge 40. If, however, there is a need to read data from a cartridge 40 stored in original LSM 20, and optional tape drive 34 is not available, then a pass-through system, designated generally by reference numeral 42 in FIG. 2, is utilized.

Figure 2:
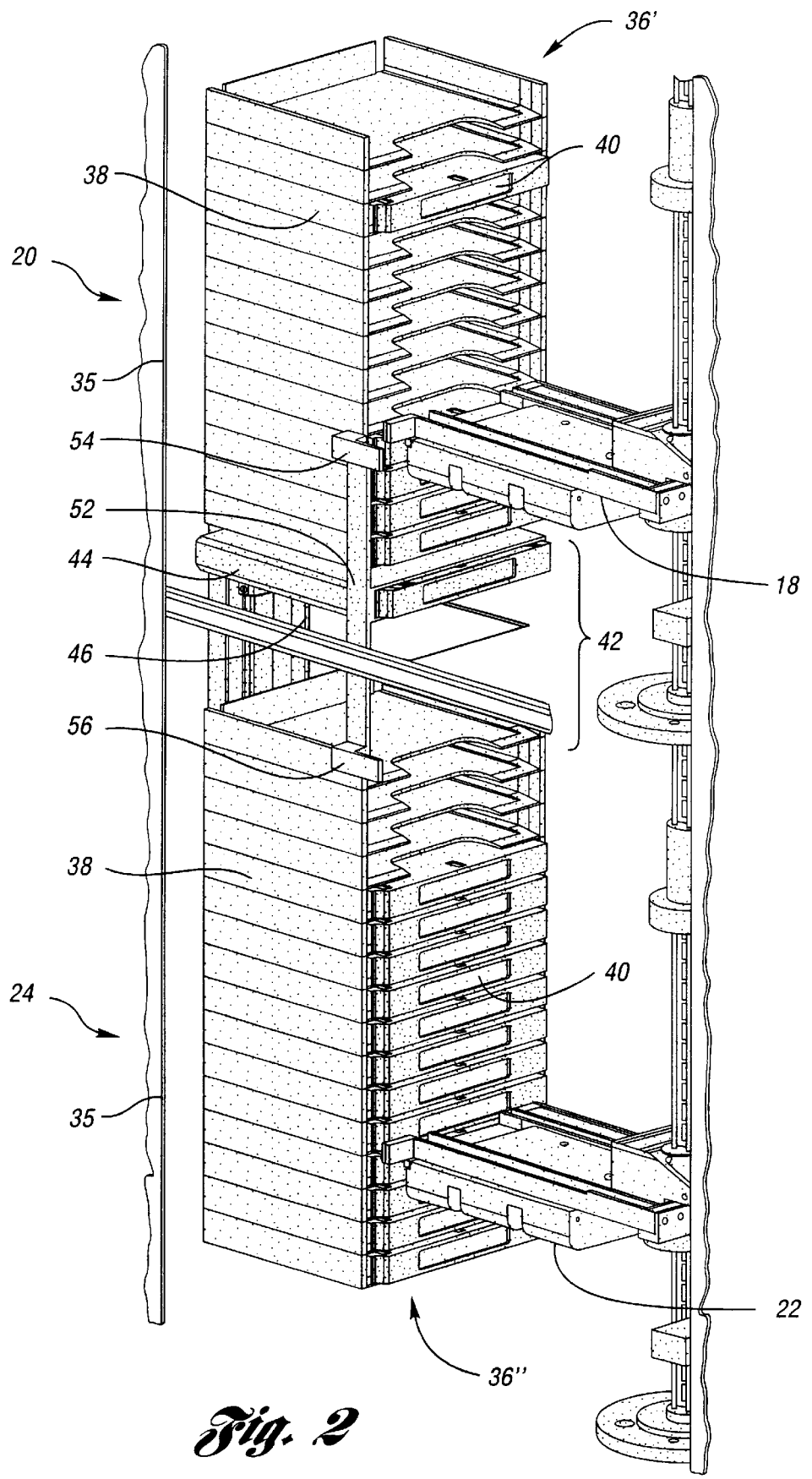
FIG. 2 shows the library storage module and pass-through system of the present invention adjacent to an additional library storage module.

With reference to FIGS. 1 and 2, in order to access data from a tape cartridge 40 stored in original LSM 20 in the absence of optional tape drive 34, processor 12 communicates with LCU 14 to cause robotic arm 18 of original LSM 20 to retrieve cartridge 40 from its storage cell 38. Through further signals from processor 12, robotic arm 18 of original LSM 20 inserts cartridge 40 into a designated cell located in a particular cell array 36' of original LSM 20. This designated cell, termed the pass-through tray 44, is used to transport cartridge 40 from cell array 36', through respective pass-through ports 46 provided in original LSM 20 and additional LSM 24, and into a cell array 36" within additional LSM 24. Processor 12 next directs robotic arm 22 of receiving LSM 24 to retrieve cartridge 40 from pass-through tray 44. Further signals from processor 12 direct robotic arm 22 of receiving LSM 24 to insert cartridge 40 into tape drive 32. Processor 12 then communicates with TCU 30 which operates tape drive 32 to read the data from cartridge 40 requested by processor 12. Finally, TCU 30 communicates the requested data back to processor 12.

As shown in FIG. 2, pass-through tray 44 is initially located at the end of array 36' closest to additional LSM 24. Pass-through tray 44 has a structure similar to any other storage cell 38 within original LSM 20 or additional LSM 24, and is aligned with the other storage cells 38 within arrays 36' and 36". However, pass-through tray 44 is movable, and may be separated from the end of array 36' and joined to the end of array 36", as described below.

Figure 3:
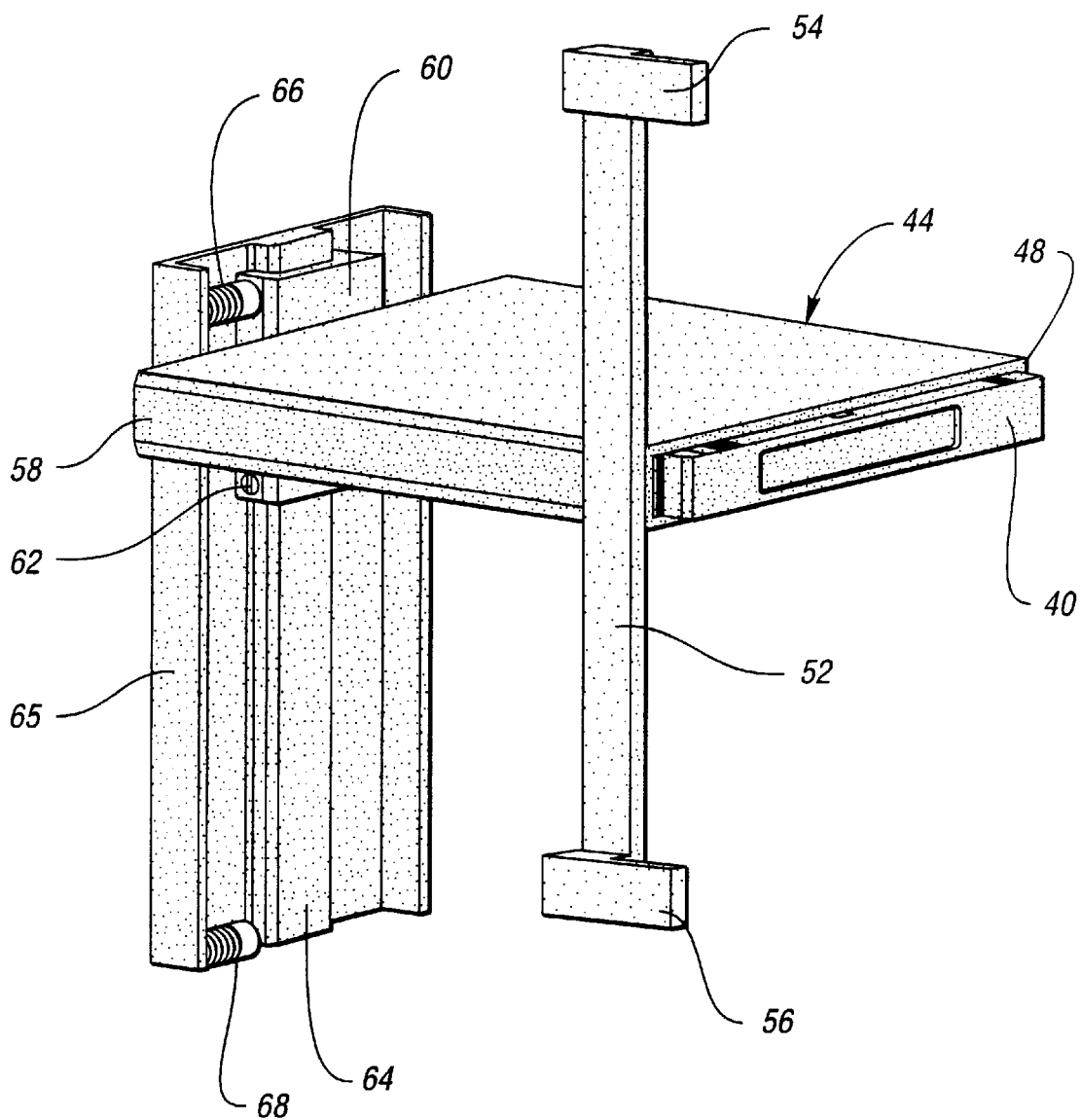
FIG. 3 is a fragmentary view of the pass-through system of the present invention.

Referring to FIGS. 2 and 3, the front 48 of pass-through tray 44 is accessible to robotic arms 18 and 22 for inserting and retrieving tape cartridges 40. Attached to one side 50 of pass-through tray 44 is an extension bar 52 which is aligned generally along arrays 36' and 36". Extension bar 52 extends both above and below pass-through tray 44, and is provided with arms 54 and 56 on either end thereof. Arms 54 and 56 provide an engagement surface by which robotic arms 18 and 22, respectively, may move pass-through tray 44 between original LSM 20 and additional LSM 24.

Attached to the back 58 of pass-through tray 44 is a linear slide bearing 60 which is provided with at least one detent 62 along the side thereof. Linear slide bearing 60 is constructed to ride along a guide rail 64 which is affixed to the interior of housing 35 and extends generally perpendicularly through pass-through ports 46 provided in original LSM 20 and additional LSM 24. Via bracket 65, a first spring-loaded pin 66 is affixed inside original LSM 20 and a second spring-loaded pin 68 is affixed inside additional LSM 24. Upon abutment by linear slide bearing 60, spring-loaded pins 66 and 68 act to seat in bearing detent 62, thereby creating a locked position of pass-through tray 44 inside each LSM. Alternatively, a plurality of pins may be provided to allow for multiple locked positions of pass-through tray 44.

Pass-through tray 44 may be sized to receive a single tape cartridge 40 or, in an alternative embodiment, may be partitioned to provide compartments for multiple cartridges. The capacity to transfer multiple cartridges simultaneously is beneficial, since many job sets comprise more than one cartridge. Of course, including multiple cells in pass-through tray 44 would further eliminate space for storage cells 38 within an LSM. Pass-through tray 44 can be positioned in any array 36 within an LSM. In fact, pass-through trays 44 may be used in multiple arrays 36 within a single LSM. For LSMs in which mixed media types are stored, multiple pass-through systems 42 of different sizes could be provided.

The preferred method of operation of pass-through system 42 is described as follows. First, processor 12 directs robotic arm 18 of original LSM 20, through LCU 14, to retrieve a tape cartridge 40 from a storage cell 38 anywhere within original LSM 20. Since tape cartridge 40 is to be passed to additional LSM 24, processor 12 directs robotic arm 18 of original LSM 20 to insert tape cartridge 40 into pass-through tray 44. Initially, first spring-loaded pin 66 is seated within bearing detent 62 in original LSM 20. In order to move pass-through tray 44 from original LSM 20 into additional LSM 24, robotic arm 18 must provide enough force on arm 54 to unseat spring-loaded pin 66 from bearing detent 62. Robotic arm 18 pushes arm 54 toward additional LSM 24, and linear slide bearing 60 is moved along guide rail 64 until second spring-loaded pin 68 is encountered. Spring-loaded pin 68 then seats in bearing detent 62 to lock pass-through tray 44 in its new location within additional LSM 24. Next, tape cartridge 40 is retrieved from pass-through tray 44 by robotic arm 22 of additional LSM 24, in response to signals communicated from processor 12. Tape cartridge 40 may then be inserted in tape drive 32 by robotic arm 22 of additional LSM 24, or alternatively placed in an available storage cell 38. Of course, movement of pass-through tray 44 in the opposite direction, from additional LSM 24 to original LSM 20, would simply require a reversal of the preceding description, with the process being initiated with commands from processor 12 to robotic arm 22.

Although library storage modules 20 and 24 and associated pass-through system 42 have been presented in the context of use within an automated cartridge library 10, it will be understood that the present invention may be implemented in any type of cartridge library. Accordingly, robotic arms 18 and 22 may be replaced by any type of manually-operated actuators which are operable to effect movement of the pass-through tray between adjacent library storage modules 20 and 24.

Therefore, as described above, the pass-through system shown and described herein is completely interchangeable, so as to be operable in any direction between library storage modules that are vertically juxtaposed. In addition, the library storage module and pass-through system of the present invention does not require the orientation of the tape cartridge to be changed as it is transferred between library storage modules. The present invention provides these features without requiring the use of extra motors, amplifiers, sensors, and associated electrical equipment. Furthermore, the pass-through system is simple and compact in nature, and is relatively inexpensive to produce and maintain.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A library storage module for storing a plurality of cartridges, the library storage module comprising:
    a housing having a pass-through port formed therein;
    a pass-through tray disposed within the housing, the pass-through tray sized to receive at least one cartridge; and
    an actuator located within the housing in proximity to the pass-through tray;
    wherein the library storage module may be interfaced with a vertically adjacent library storage module having a pass-through port, and the actuator is operable to move the pass-through tray and any cartridges contained therein into the adjacent storage module through the respective pass-through ports without requiring rotation of the pass-through tray.

2. The library storage module of claim 1, wherein the actuator comprises an automated, robotic arm.

3. The library storage module of claim 1, wherein the actuator is manually operated.

4. The library storage module of claim 1, further comprising a guide rail along which the pass-through tray moves, wherein the guide rail is affixed to the housing.

5. The library storage module of claim 4, wherein the guide rail is sized to extend into the additional library storage module.

6. The library storage module of claim 4, wherein the pass-through tray is provided with a linear slide bearing constructed to ride along the guide rail.

7. The library storage module of claim 6, wherein the linear slide bearing is provided with a detent therein.

8. The library storage module of claim 7, further comprising a spring-loaded pin affixed to the housing, wherein the spring-loaded pin is sized to seat in the detent to provide a locked position of the pass-through tray.

9. The library storage module of claim 1, wherein the pass-through tray is provided with an extension bar attached thereto, the extension bar providing an engagement surface for the actuator in order to move the pass-through tray.

10. The library storage module of claim 1, wherein the housing is cylindrical.

11. The library storage module of claim 1, wherein the housing is polygonal.

12. A pass-through system for transferring cartridges between two vertically adjacent library storage modules, each library storage module having a respective pass-through port, the pass-through system comprising:

a pass-through tray located in one of the library storage modules, wherein the pass-through tray is sized to receive at least one cartridge; and an actuator located in each library storage module, wherein each actuator is operable to move the pass-through tray and any cartridges contained therein from one library storage module to the other library storage module through the respective pass-through ports without requiring rotation of the pass-through tray.

13. The pass-through system of claim 12, wherein the actuator comprises an automated, robotic arm.

14. The pass-through system of claim 12, wherein the actuator is manually operated.

15. The pass-through system of claim 12, further comprising a guide rail extending between the library storage modules along which the pass-through tray moves.

16. An automated cartridge library comprising:

at least two vertically adjacent library storage modules, each library storage module having a respective pass-through port;

a pass-through tray located in one of the library storage modules, wherein the pass-through tray is sized to receive at least one cartridge; and a robotic arm located in each library storage module, wherein each robotic arm is operable to move the pass-through tray and any cartridges contained therein from one library storage module to the other library storage module through the respective pass-through ports without requiring rotation of the pass-through tray.

17. A method for transferring cartridges between two vertically adjacent library storage modules, each library storage module having a respective pass-through port, the method comprising:

inserting at least one cartridge in a pass-through tray located in one of the library storage modules;

moving the pass-through tray and the at least one cartridge contained therein from one library storage module to the adjacent library storage module through the respective pass-through ports without requiring rotation of the pass-through tray; and retrieving the at least one cartridge from the pass-through tray in the adjacent storage module.

18. The method of claim 17, wherein the pass-through tray is moved using a robotic arm.

19. The method of claim 17, wherein the pass-through tray is moved manually.

20. The method of claim 17, wherein moving the pass-through tray comprises engaging and applying force to an extension bar affixed to the pass-through tray.

21. The method of claim 17, wherein moving the pass-through tray comprises moving the pass-through tray along a guide rail extending between the library storage modules.

22. The method of claim 17, further comprising locking the position of the pass-through tray.

* * * * *